US006435526B1

United States Patent
Karlsson

(10) Patent No.: US 6,435,526 B1
(45) Date of Patent: Aug. 20, 2002

(54) AXLE LIFTING DEVICE FOR A VEHICLE

(75) Inventor: Peter Karlsson, Södertälje (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/446,045

(22) PCT Filed: Apr. 27, 1999

(86) PCT No.: PCT/SE99/00682

§ 371 (c)(1),
(2), (4) Date: Dec. 15, 1999

(87) PCT Pub. No.: WO99/55576

PCT Pub. Date: Nov. 4, 1999

(30) Foreign Application Priority Data

Apr. 29, 1998 (SE) ............................... 9801492

(51) Int. Cl.⁷ .............................. B06G 1/00; B60P 1/00; B62D 1/00
(52) U.S. Cl. ................. 280/86.5; 280/43; 280/43.17; 280/405.1; 180/209
(58) Field of Search ............................ 280/86.5, 405.1, 280/43, 43.17; 180/209

(56) References Cited

U.S. PATENT DOCUMENTS

| | | | | |
|---|---|---|---|---|
| 3,201,141 A | | 8/1965 | Bernstein et al. | 280/104.5 |
| 3,246,884 A | * | 4/1966 | Frichard et al. | |
| 3,704,896 A | * | 12/1972 | Buelow | 280/86.5 X |
| 3,713,663 A | * | 1/1973 | Granning | 280/86.5 X |
| 3,747,948 A | * | 7/1973 | Granning | 280/86.5 X |
| 3,912,293 A | * | 10/1975 | Harbers | 280/86.5 X |
| 4,157,188 A | * | 6/1979 | Sims | 280/43.23 X |
| 4,165,792 A | * | 8/1979 | Hohl et al. | 280/86.5 X |
| 4,314,709 A | * | 2/1982 | Silbernagel | 280/43.23 X |
| 4,504,437 A | | 3/1985 | Becker | 280/704 |
| 5,588,665 A | * | 12/1996 | Perce et al. | 180/209 |

FOREIGN PATENT DOCUMENTS

| | | | | |
|---|---|---|---|---|
| DE | 2133754 | * | 8/1984 | 280/405.1 |
| EP | 0416310 | | 3/1991 | |
| EP | 0431673 | | 6/1991 | |
| EP | 561366 | * | 9/1993 | 280/405.1 X |
| SU | 785100 | * | 12/1980 | 280/405.1 X |

\* cited by examiner

*Primary Examiner*—Lanna Mai
*Assistant Examiner*—Toan To
(74) *Attorney, Agent, or Firm*—Ostrolenk, Faber, Gerb & Soffen, LLP

(57) ABSTRACT

A lifting arrangement for a wheel shaft of a vehicle operates on a wheel shaft that is movably suspended in a vehicle frame structure through one or more stay devices. The stay devices are articulatedly connected to the frame structure through at least one frame connection, and to the wheel shaft by at least one shaft connection. A lifting device is arranged in connection with the frame structure and the stay device to raise the wheel shaft in a vertical direction relative to the frame structure when actuated. The stay device provides a compact mechanism to permit the vehicle axle to be lifted, while preserving room for other vehicle components.

17 Claims, 3 Drawing Sheets

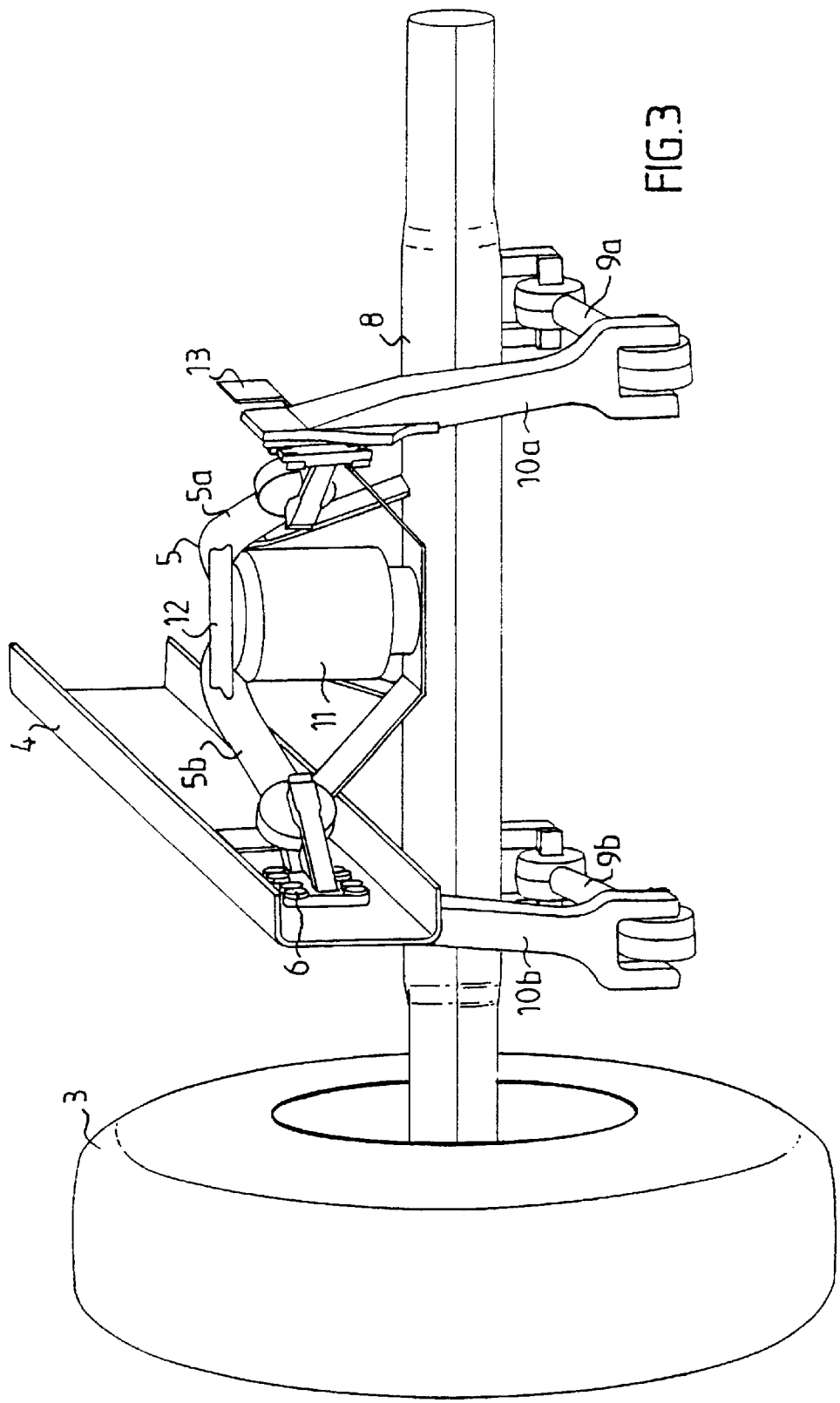

AXLE LIFTING DEVICE FOR A VEHICLE

BACKGROUND TO THE INVENTION, AND STATE OF THE ART

The invention relates to a lifting arrangement for a wheel shaft of a vehicle articulated stays for raising the wheel vertically.

Such lifting arrangements of wheel shafts of vehicles are previously known, inter alia, on load-carrying vehicles which incorporate under their load surface two wheel shafts, viz. one driving shaft and one supporting shaft. In an unloaded state the load-carrying vehicle travels mostly with the supporting shaft raised so that the wheels of the driving shaft obtain a good driving grip on the roadway. In a loaded state the supporting shaft is lowered so that the load carried can be distributed over the wheels of both shafts.

Such lifting arrangements incorporate a lifting device, usually in the form of an air bellows arranged between the vehicle's frame structure and the supporting shaft. The wheel suspension of such a supporting shaft usually incorporates an upper V-shaped reaction stay which extends between the vehicle's frame structure and the supporting shaft. The V-shaped reaction stay is arranged forward of the shaft and the air bellows is therefore installed on a bracket to the rear of the shaft. As such a vehicle incorporates a multiplicity of components which have to be accommodated or which it is appropriate to install in the vicinity of such a wheel shaft, this location of the air bellows constitutes an obstacle to installing those components. Such a component may be a towing device which makes it possible to attach a trailer vehicle. It is therefore advantageous if the towing device can be installed far forward on the vehicle and preferably in a position immediately to the rear of the rear wheel shaft. This position is also suitable for installing compressed air tanks.

SUMMARY OF THE INVENTION

The object of the present invention is to provide a lifting arrangement of the kind mentioned in the introduction for a wheel shaft of a vehicle, which arrangement makes it possible to design and install the lifting device so that it occupies a small space on the vehicle and does not encroach upon the natural or necessary location of other components.

This object is achieved according to the invention by the lifting arrangement mentioned in the introduction which is characterised in that the lifting device is designed to make said lifting possible by displacing the stay device relative to the frame structure. The lifting device will consequently act upon the stay device, and such a technical solution makes it possible to install the lifting device forward of the wheel shaft. The desired space to the rear of the wheel shaft for installing, for example, a towing device or compressed air tanks is thus obtained. Such a lifting device can also be provided with a shorter travel, since this location results in wheel shaft lifting being accomplished with a shorter lever. The result below the lifting device is therefore a space which means that necessary components installed in the vicinity of the wheel shaft, such as control and brake devices, have more space.

According to a preferred embodiment of the invention, the stay device is connected by means of a first fastening element to an upper end of the lifting device. Such a fastening element can be smaller and simpler than a conventional fastening element, since such a conventional fastening element has to extend a relatively long distance between the supporting shaft and the upper end of the lifting device situated to the rear. The fastening element according to the invention may be an integrated part of the stay device and be already fastened to the stay device in the course of manufacture. The frame structure may be connected by means of a second fastening element to a lower end of the lifting device. The lower end of the lifting device is thus provided with stable support and secure fastening to the frame structure. Advantageously, said first and second fastening elements are so oriented that the lifting device has a substantially vertical extent between its upper and lower ends. The lifting device is thus of compact design which occupies a very small space horizontally on the vehicle.

According to a further preferred embodiment of the invention, the stay device comprises two stay elements which form a substantially V-shaped configuration. With such a configuration of the stay device, the first fastening element can extend between the two stay elements and thereby form a stable upper bracket for the lifting device.

The lifting device according to the invention is applicable with advantage on a vehicle which has a frame structure which incorporates two frame side-members extending in the longitudinal direction of the vehicle, whereby each of the stay elements has one end articulatedly connected to its respective frame side-member and a common end articulatedly connected to the wheel shaft. Here it is advantageous that the second fastening element extend between and be connected to said frame side-members, whereby the second fastening element can provide stable support for the lifting device. For said lifting to take place, the lifting device may be designed to be variable in length in order to bring about said displacement of the stay device relative to the frame structure. Such a lifting device may with advantage incorporate an air bellows or a hydraulic cylinder, but other variable-length lifting devices are also conceivable.

BRIEF DESCRIPTION OF THE DRAWINGS

A preferred embodiment of the invention is described below by way of example with respect to the attached drawings, in which FIG. 3 depicts the lifting part of the device in FIG. 2, seen substantially from in front.

DETAILED DESCRIPTION OF A PREFERRED EMBODIMENT OF THE INVENTION

Figure 1:
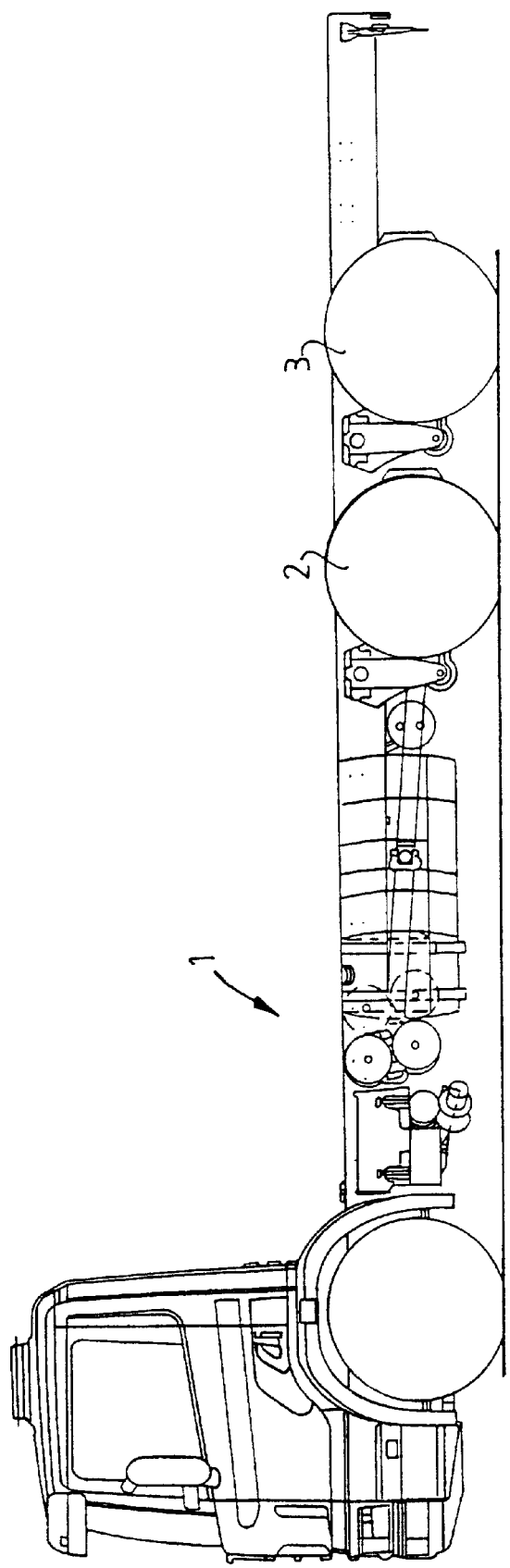
FIG. 1 depicts a vehicle on which a lifting device according to the invention is applicable.

FIG. 1 shows a load-carrying vehicle 1 on which a lifting arrangement according to the invention is applicable. The vehicle 1 incorporates under its load-carrying surface a first wheel shaft with driven wheels 2 and a second wheel shaft with undriven wheels 3. When the vehicle 1 travels unladen, the wheels 3 of the rear wheel shaft may be raised from the ground. The driving wheels 2 are thereby provided with a better driving grip on the roadway. When the vehicle 1 is heavily laden, the wheels 3 are lowered to the ground so that the heavy load is distributed between the driven wheels 2 of the first shaft and the wheels 3 of the second shaft.

Figure 2:
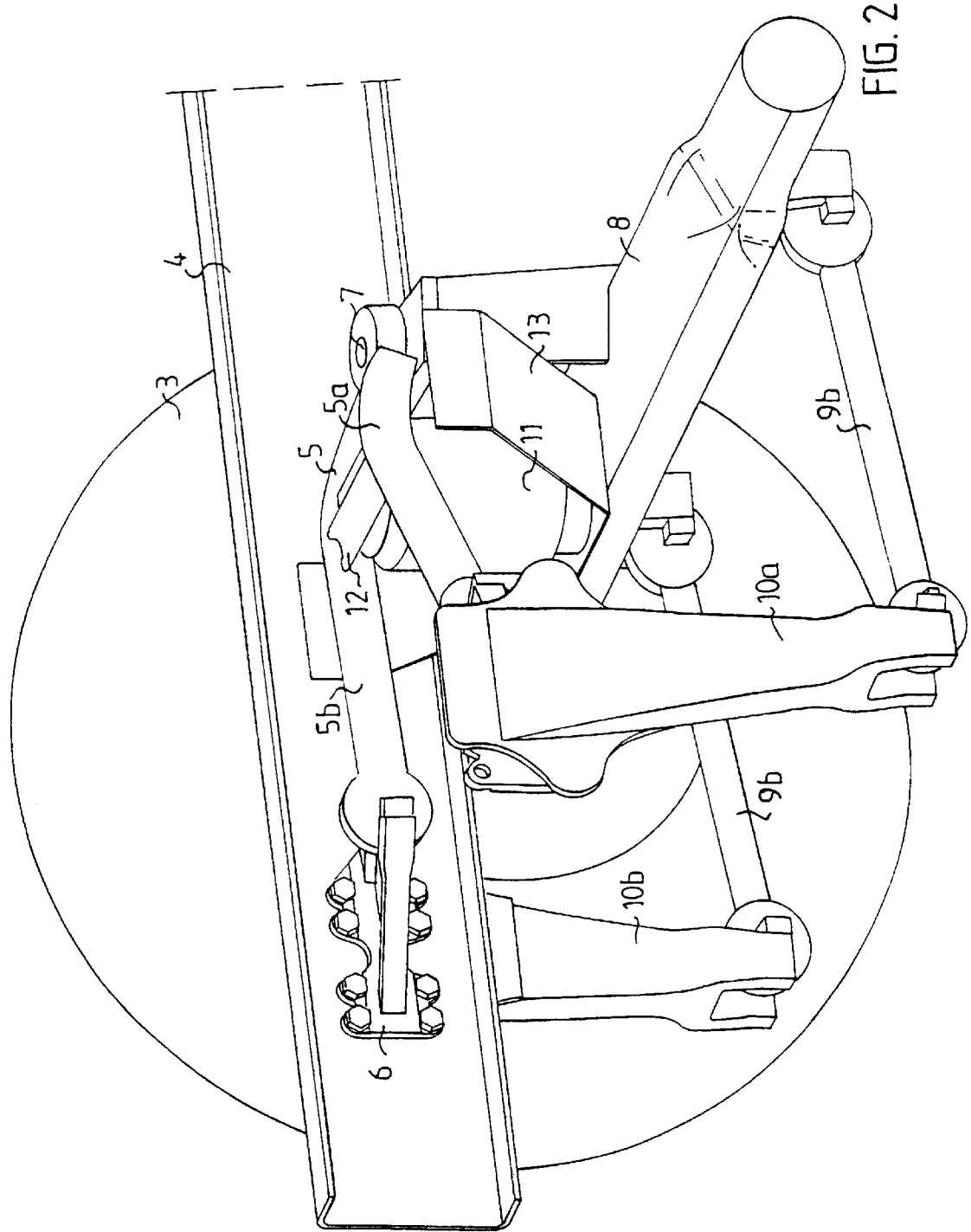
FIG. 2 depicts part of a lifting device according to a preferred embodiment of the invention, seen obliquely substantially from the side with near side elements omitted for clear viewing

FIGS. 2 and 3 show an embodiment of the lifting arrangement according to the invention. The vehicle 1 incorporates two frame side-members 4 extending in its longitudinal direction, only one of which is depicted in the drawings. A substantially V-shaped upper stay device 5 which incorporates two stay elements 5a, 5b is fastened in the frame side-members 4. Each of the stay elements 5a, 5b has one end articulatedly connected to its respective frame side-member 4 by means of a frame connection 6a. The stay elements 5a, 5b have a common second end which is articulatedly connected by means of a shaft connection 7 to an upwardly protruding portion which is firmly arranged on a wheel shaft 8.

The wheel suspension also incorporates two lower reaction stays 9a, 9b which have their first ends articulatedly connected to the wheel shaft 8. The other ends of the reaction stays 9a, 9b are articulatedly connected to fastening devices 10a, 10b which extend downwards from the vehicle's frame side-members 4. The wheel shaft 8 is thus articulatedly suspended in the vehicle's frame side-members 4 in an upper V-shaped stay device 5 and two lower reaction stays 9a, 9b. The wheel shaft 8 is of course also suspended in springs and shock absorbers, but these components are not depicted in the drawings.

An air bellows 11 is designed to make it possible to raise the wheel shaft 8 by displacing the V-shaped stay device 5 relative to the frame side-members 4. A first fastening element 12 extends between the stay elements 5a, 5b and is connected to an upper end of the air bellows 11. A second fastening element 13 is connected to the lower end of the air bellows 11 and extends between and is connected to the frame side-members 4.

To raise the wheel shaft 8, compressed air is supplied to the air bellows 11, making the latter expand in the longitudinal direction. Expansion of the air bellows 11 causes the first fastening element 12 to move upwards so that the common end of the stay elements 5a, 5b connected to the first fastening element 12 is raised upwards. As the wheel shaft 7 is articulatedly connected, via the upward protruding portion and by means of the shaft connection 7, to the common end of the stay elements 5a, 5b, the result is raising of the wheel shaft 8. Lowering the wheel shaft 8 back to the ground surface is brought about by reducing correspondingly the amount of compressed air in the air bellows 11 whereby the subsequent downward movement is transmitted from the first fastening element 12 via the stay elements 5a, 5b, the shaft connection 7 and the upwardly protruding portion to the wheel shaft 8.

Installing the air bellows 11 forward of the wheel shaft 8 results to the rear of the shaft in a space which can be used to accommodate other components. Such components may consist of a towing device which makes it possible to attach a trailer vehicle one or more compressed air tanks etc. Arranging the air bellows 11 so that it acts upon the stay device 5 forward of the wheel shaft 7 means that a smaller lever is used for raising the wheel shaft 8 and a greater lifting force is therefore required, which may of itself be a disadvantage. This is compensated for, however, by the fact that the air bellows 11 does not require such a large travel in order to raise the wheel shaft 8. The result is a space below the air bellows 11 which can with advantage be used for necessary components such as pneumatic brake cylinders and track rods if the wheel shaft is provided with steering.

The invention is not limited to the embodiment described above but may be varied freely within the scope of the ensuing patent claims. The stay device designed to be displaced by the lifting device may for example be of some other form than a substantially "V" shape. It may for example have a "U" or some other suitable shape. Nor need the lifting device consist of an air bellows, as it may consist of another pneumatic lifting arrangement, a hydraulic cylinder or some other type of lifting device.

What is claimed is:

1. A lifting arrangement for a wheel shaft of a vehicle wherein the wheel shaft is movably suspended in a frame structure of the vehicle, the lifting arrangement comprising:
   a stay device including a connection portion, a first articulated connection between the connection portion of the stay device and the frame structure of the vehicle for enabling swinging of the stay device around the first articulated connection;
   a second articulated connection between the wheel shaft and the stay device;
   a lifting device connected with the stay device for displacing the stay device around the first articulated connection relative to the frame structure and, through the second articulated connection, displacing the wheel shaft vertically with respect to the frame structure.

2. The lifting arrangement of claim 1, further comprising a first fastening element at the second articulated connection and the first fastening element connecting the stay device and the lifting device.

3. The lifting arrangement of claim 2, wherein the lifting device has an upper end and a lower end; the first fastening element connects to the upper end of the lifting device.

4. The lifting arrangement of claim 2, wherein the first fastening element is an integrated part of the stay device.

5. The lifting arrangement of claim 1, further comprising a lift fastening element connecting the frame structure of the vehicle and the lifting device.

6. The lifting arrangement of claim 5, wherein the lifting device has an upper end and a lower end; the lift fastening element is connected to the lower end of the lifting device.

7. The lifting arrangement of claim 6, further comprising a first stay fastening element between the stay device and the lifting device.

8. The lifting arrangement of claim 7, wherein the first stay fastening element connects to the upper end of the lifting device.

9. The lifting arrangement of claim 8, wherein the lifting device has a substantially vertical extent between the upper and lower ends thereof.

10. The lifting arrangement of claim 2, farther comprising a lift fastening element connecting the frame structure of the vehicle and the lifting device.

11. The lifting arrangement of claim 10, wherein the lifting device has a substantially vertical extent between the upper and lower ends thereof.

12. The lifting arrangement of claim 11, wherein the stay device includes first and second stay elements which are each articulatedly connected to the frame structure at a respective one of the first articulated connections, and the stay elements extend away from the respective first articulated connections and are joined together and swing together.

13. The lifting arrangement of claim 12, wherein the stay elements of the stay device are so oriented and so joined together as to form a substantially v-shaped configuration.

14. In combination the lifting arrangement of claim 12, and a vehicle frame structure including two frame side members extending in the longitudinal direction of the vehicle;
   each of the stay elements has one end articulatedly connected to a respective one of the frame side members at the first articulated connection between them; the stay elements being connected to each other at a common end away from the first articulated connection and the second connection articulated connection the common end of the stay device to the wheel shaft.

15. The combination of claim 14, wherein the lifting device is connected with the frame structure of the vehicle so that the lifting device can operate the stay device to move with respect to the frame structure; a lift fastening element extending between and being connected to the frame side members.

16. The lifting arrangement of claim 1, wherein the lifting device is of variable length to bring about raising of the wheel shaft.

17. The lifting arrangement of claim 16, wherein the lifting device incorporates an air bellows.

* * * * *